US012800291B2

(12) United States Patent
Sepkhanov

(10) Patent No.: US 12,800,291 B2
(45) Date of Patent: Nov. 17, 2026

(54) METHOD FOR COMBINING HEIGHT MAPS AND PROFILOMETER FOR THE SAME

(71) Applicant: MITUTOYO CORPORATION, Kanagawa (JP)

(72) Inventor: Ruslan Akhmedovich Sepkhanov, El Eindhoven (NL)

(73) Assignee: MITUTOYO CORPORATION, Kanagawa (JP)

( * ) Notice: Subject to any disclaimer, the term of this patent is extended or adjusted under 35 U.S.C. 154(b) by 158 days.

(21) Appl. No.: 18/972,183

(22) Filed: Dec. 6, 2024

(65) Prior Publication Data

US 2025/0189303 A1 Jun. 12, 2025

(30) Foreign Application Priority Data

Dec. 7, 2023 (EP) .................................... 23214829

(51) Int. Cl.
*G01B 11/06* (2006.01)
*G01B 9/02* (2022.01)
*G01B 11/24* (2006.01)

(52) U.S. Cl.
CPC ...... *G01B 11/0608* (2013.01); *G01B 9/02085* (2013.01); *G01B 11/2441* (2013.01)

(58) Field of Classification Search
CPC ............ G01B 11/0608; G01B 9/02085; G01B 11/2441; G01B 9/02075; G01B 11/24; G01B 2210/52; G06T 2207/10028; G06T 7/32; G06T 7/521
See application file for complete search history.

(56) References Cited

U.S. PATENT DOCUMENTS

| | | | | |
|---|---|---|---|---|
| 5,991,461 | A | 11/1999 | Schmucker et al. | |
| 8,331,726 | B2 * | 12/2012 | Stellari | G06T 7/32 382/284 |
| 8,447,561 | B2 | 5/2013 | Negishi | |
| 11,466,976 | B2 | 10/2022 | Quaedackers | |
| 2011/0249910 | A1 | 10/2011 | Henderson et al. | |
| 2019/0063905 | A1 | 2/2019 | Venkataraman et al. | |

OTHER PUBLICATIONS

European Search Report issued in European Patent Office (EPO) Patent Application No. 26164245.8, dated Jun. 1, 2026.

European Search Report issued in European Patent Office (EPO) Patent Application No. 26164241.7, dated Jun. 12, 2026.

Furukawa, R et al: "Laser Range Scanner Based On Self-Calibration Techniques Using Coplanarities And Metric Constraints", Computer Vision and Image Understanding Academic Press., US, vol. 113, No. 11, Nov. 1, 2009, pp. 1118-1129.

(Continued)

*Primary Examiner* — Hwa Andrew Lee
(74) *Attorney, Agent, or Firm* — Greenblum & Bernstein, P.L.C.

(57) ABSTRACT

The invention relates to a method for measuring a first height map and a second height map of a sample surface with a profilometer and combining the first and second height maps to a composite height map. The invention further relates to a profilometer configured for measuring a first height map and a second height map and combining the first and second height maps to a composite height map.

13 Claims, 4 Drawing Sheets

(56) References Cited

OTHER PUBLICATIONS

Vijayarangan Srinivasan et al: "Stereo Perception in the Dark using Uncalibrated Line Laser", 2021 IEEE/RSJ International Conference on Intelligent Robots and Systems (IROS), Sep. 27, 2021 (Sep. 27, 2021), pp. 8745-8750.
Al-Nuaimi Anas: "Methods of Point Cloud Alignment with Applications to 3D Indoor Mapping and Localization", Oct. 4, 2016.
Bernardini F. et al: "High-quality Texture Reconstruction From Multiple Scans", IEEE Transactions on Visualization and Computer Graphics, vol. 7, No. 4, Aug. 6, 2002, pp. 318-332.
Ravanbakhsh M. et al: "Dem Registration Based on Mutual Information", ISPRS Annals of Photogrammetry, Remote Sensing and Spatial Information Sciences, vol. I-4, Jul. 20, 2012, pp. 187-191.
European Search Report issued in European Patent Office (EPO) Patent Application No. 23 21 4829, dated May 13, 2024.

* cited by examiner

METHOD FOR COMBINING HEIGHT MAPS AND PROFILOMETER FOR THE SAME

FIELD OF THE INVENTION

The invention relates to a method for measuring a first height map and a second height map of a sample surface with a profilometer and combining the first and second height maps to a composite height map. The invention further relates to a profilometer configured for measuring a first height map and a second height map and combining the first and second height maps to a composite height map.

BACKGROUND OF THE INVENTION

Known methods of obtaining a composite height map include measuring first and second height maps and choosing a subsurface, also known as template, of at least one of the height maps which is then moved over, a subsurface of, the other one of the height maps to determine a similarity between the two subsurfaces. Generally, the subsurfaces may be chosen based on the presence of recognizable features which may be used to correlate the two subsurfaces, e.g. such as in U.S. Pat. No. 8,447,561B2. In other words, known methods rely on the determining of recognizable features of the height maps and matching these features between them.

The known methods have a number of problems which the invention aims to alleviate. In particular, the one or more templates have to be chosen such that the height maps overlap in the region of the templates. In order to prevent incorrect combining of the height maps, e.g. due to the presence of similar features on the height maps, multiple templates may have to be tested.

OBJECT OF THE INVENTION

The first aspect of the invention aims to overcome the above mentioned problem. The invention also aims to provide an alternative method to determine an overlap region and thus to obtain a composite height map by stitching the height maps.

SUMMARY OF THE INVENTION

The aim of the first aspect of the invention is achieved by the method according to claim 1.

The invention relates to a method for measuring a first height map and a second height map of a sample surface of a sample with a profilometer, for example an optical profilometer, and combining the first and second height maps to a composite height map. The profilometer may be any suitable profilometer which allows to measure multiple fields of view of a sample surface to obtain two or more height maps which may need to be combined to obtain a composite height map of the sample surface. The first and second height map may be two height maps of a plurality of height maps of the sample surface. For example, the obtained composite height map may further be combined with a third height map to obtain a bigger composite height map.

The method includes measuring the first and second height maps with a sensor of the profilometer. The sensor maybe an optical sensor, however any suitable type of sensor may be used. The sensor may include multiple pixels for obtaining pixel data related to the height of the sample surface in a field of view of the sensor. The sensor is moved relative to the sample surface, for example by moving a holder for holding the sample surface relative to an objective of the sensor, so that the first and second height maps are measured in partially overlapping fields of view of the sensor. As a result, the first and second height map include a region which contains the same height information and along which region the first and second height maps maybe stitched to obtain a composite height map of, part of, the sample surface.

The method further includes combining the first and second height maps to produce the composite height map of the sample surface. The combining of the height maps includes determining a first overlap region of the first and second height maps by partially overlapping the first and second height maps, in which first overlap region the first and second height maps overlap. In contrast to known methods, wherein a template of the height maps is chosen which template is then moved over a template of the other one of the height maps, the method of the invention includes directly taking both first and second height map and partially overlapping them to define the first overlap region. The templates in known methods correspond to a portion of a measured height map.

A first similarity, for example based on a correlation or a sum of absolute differences, between the first and second height maps in the first overlap region is determined by determining a similarity, for example a correlation between the first and second height maps in the overlap region using a similarity measure. Thus, after overlapping the first and second height map a similarity, based on the similarity measure, is assigned to the first overlap region, which similarity provides a value for the amount of similarity between the first and second height maps in the overlap region. For example, the first similarity value may be based on a sum of squares of differences between height values of the first and second height maps in the first overlap region.

After determining the first similarity, a second overlap region of the first and second height maps is determined by shifting the first and second height maps relative to each other compared to the first overlap region. For example, the first height map may be shifted a pixel distance in an x-direction relative to the second height map. Thus, rather than moving a template of height map, the complete height maps are shifted relative to each other, this increases the amount of available information to determine the correct overlap region and does not require choosing and moving templates relative to each other. The first and second overlap regions may generally have different surface areas due to the relative movement of the height maps.

A second similarity is determined between the first and second height maps by determining a similarity between the heights of the first and second height map in the second overlap region using the similarity measure. The second similarity is comparable to the first similarity in a sense that a relative difference between the two provides information on the difference in similarity between the height maps in the first and second overlap regions. Preferably the first similarity and the second similarity are based on the same similarity measure.

The first and second similarities are compared by normalizing the first and second similarities based on the respective surface areas of the overlap regions. For example, the first and second similarities may be normalized by a number of pixels present in each of the overlap region. Normalizing the first and second similarities allows to directly compare the first and second similarities which allows to compare the amount of similarity in the first overlap region with the amount of similarity in the second overlap region.

The first and second height maps are then combined by stitching the first and second height maps in one of the first and second overlap regions based on the comparing of the first and second similarities. For example, the stitching may be done by transforming a coordinate frame of one of the height maps to a coordinate from the other one of the height maps based on the comparing of the first and second height maps. For example, the stitching the height maps into a composite height map may be done by taking a weighted average of the heights from the said height maps, wherein the weights are determined based on the distance between the said pixel and the center of the respective heightmap. For example, the first and second height maps maybe stitched in the overlap region having a higher or highest similarity. For example, in case a plurality of similarities of a plurality of overlap regions are compared, the highest of the similarities may be used to determine which of the overlap region is used to stitch the height maps.

The invention allows to more efficiently stitch the first and second height maps because there is no need to determine a template of the height maps or to perform a preliminary analysis of the height maps to determine a relevant feature which may be used to determine the template. Furthermore, the method of the invention may be more accurate because more information on the height maps is used in determining the similarity compared to only using information available in the templates.

In embodiments, the method further includes:

- determining a plurality of overlap regions of the first and second height maps by shifting the first and second height maps subsequently relative to each other, and wherein preferably a current overlap region has a different surface area than a preceding overlap region;
- determining, after each shift of the first and second height maps, a respective similarity by determining a similarity between the heights of the first and second height map in the respective overlap region using the similarity measure;
- comparing the plurality of similarities by normalizing the similarities based on the respective surface areas of the overlap regions; and
- combining the first and second height maps by stitching the first and second height maps in one of the overlap regions based on the comparing of the plurality of similarities, e.g. based on the one overlap region having a higher similarity, e.g. in the one overlap region having the highest similarity.

In these embodiments, a plurality of overlap regions are determined. Each of the overlap regions may have a different surface area compared to a previous of the overlap region. For each of the overlap region a similarity is determined and normalized which may then be used to combine the first and second height maps by stitching the height maps in the overlap region having the highest similarity.

In embodiments, the sensor includes multiple pixels, and wherein the first and second height maps are shifted relative to each other by a single pixel of the sensor, for example in an x-direction and/or y-direction of the first and second height maps, and preferably wherein the first overlap region has a surface area corresponding to a single pixel of the sensor. In other embodiments, the first and second height maps may be shifted relative to each other by a multitude of pixels, e.g. in the x-direction and/or the y-direction. The first overlap region may have a surface area corresponding to a single pixel, i.e. the first and second height maps overlap in a corner thereof with an overlap region of a single pixel, and after the determining of the similarity, the first and second height maps are shifted relative to each other, e.g. by a single pixel, to obtain the second overlap region. The first overlap region may also have a surface area corresponding to multiple pixels, or a fraction of pixel.

In embodiments, the determining of a similarity between the heights of the first and second height map includes determining a correlation between the heights of the first and second height map using a correlation measure and wherein the first and second height maps are combined based on the correlation.

In embodiments, the correlations are determined based on a zero-normalized cross-correlation function:

$$C = \frac{1}{N}\frac{1}{sV}\frac{1}{sW}\sum (V_i - meanV)(W_i - meanW)$$

wherein N is the surface area of the respective overlap region, sV is the standard deviation of heights in the respective overlap region of the first height map, sW is the standard deviation of heights in the respective overlap region of the second height map, $V_i$ are the heights in the respective overlap region of the first height map, $W_i$ are the heights in the respective overlap region of the second height map, meanV is the mean height in the respective overlap region of the first height map, and meanW is the mean height in the respective overlap region of the second height map. For example, the so obtained correlation values may be used to determine a correlation matrix which may be used to determine the overlap region used for stitching. The correlation values are normalized with respect to the surface area of the respective overlap region, N, and the standard deviations, sV and sW, allowing a direct comparison between the correlations.

A further problem related to combining height maps to obtain a composite height map is that systematic errors in the profilometer and/or the measurement technique may result in measurement artefacts in the height maps which may artificially increase or distort similarity between areas of the height maps. For example, the measurement artifacts may arise due to vibrations and/or illumination changes during measurements. For example, the first and second height map may be stitched based on the similarity which similarity depends on a measurement artifact. This may result in incorrect combining of the first and second height maps. The following embodiments of the invention aims to overcome this problem.

In embodiments, the method further includes:

- classifying features of the two height maps into sharp features and smooth features; and
- determining the similarity, e.g. correlation, for each of the overlap regions by using a weighted similarity measure, e.g. a weighted correlation, wherein the weights are based on the classification of the features into the sharp features and smooth features.

The inventors realised that measurement artifacts result predominantly in relatively smooth features compared to sharper features. By increasing the relevance of the sharper features compared to the smooth features in the determining of the similarity, i.e. determining a weighted similarity measure, the impact of measurement artifacts on the matching of the height maps maybe reduced. The features of the height maps may be classified by determining a sharpness thereof, e.g. based on a gradient or height relative to base area thereof. A feature may be classified as sharp if it belongs to the 50%, e.g. 40%, e.g. 20%, sharpest features. A feature may be classified as smooth if it is not sharp. For example, the weights may be determined on a pixel by pixel basis, e.g. based on a gradient associated with the pixel, or on a feature by feature basis. Or the weights maybe binary. For example, all sharp features are assigned a weight that is above a threshold. In embodiments, the sharp features have higher weights than the smooth features. The classification of features may depend on the specific application, for example on sample properties, sample type, or properties of the optical measuring instrument.

In embodiments, the features are classified based on a gradient thereof and/or wherein the weights are based on the gradients.

A further problem related to combining height maps to obtain a composite height map is that different flat areas of the sample surface may appear similar and may be even more similar than areas having features, for example because areas having features appearing in two different measurements, e.g. to determine the first and second height maps, may be slightly different from each other so that they have a lower similarity than two flat areas. If two different flat areas are present the height maps may be stitched along the flat areas because of the high similarity therebetween. The following embodiments of the invention aim to overcome this problem.

In these embodiments, the method further includes:

determining one or more flat regions in the first and/or second height maps;

determining modified first and second height maps by providing a variation, e.g. a random variation, in the height values of the flat regions; and determining the similarities, e.g. correlations, between the first and second height maps by determining a similarity between the heights of the first and second modified height maps in the first overlap region.

The effect of the flat regions on the similarity between the height maps is suppressed by adding a variation, preferably a random variation, e.g. such as random noise, to the flat region of at least one of the height maps to obtain a modified height map. The flat area in the modified height map will appear less flat due to the added variation. Preferably the variation is only added to one of the two height maps and the similarities are determined for one modified height map and one unmodified height map.

Flat areas may be areas lacking features. Flat areas may also be determined by looking at their deviation from a plane, for example by comparing different parts of the height map to a plane, and the deviation from the plane provides a measure of flatness. Flat areas may be determined by determining variation between normal vectors to the surface area, so that, for example, little variation in the normal vectors may indicate a flat area.

In embodiments, the one or more flat regions are determined based on a classification of features in the height maps, e.g. wherein flat regions are regions having substantially flat features, e.g. having a gradient below a predetermined threshold value.

A problem related to combining height maps to obtain a composite height map is that systematic errors in the profilometer and/or the measurement technique may result in measurement artefacts in the height maps which may artificially increase or distort similarity between areas of the height maps. For example, the measurement artifacts may arise due to vibrations and/or illumination changes during measurements. For example, the first and second height map may be stitched based on the similarity measure which similarity measure depends on a measurement artifact. This may result in incorrect combining of the first and second height maps. The second aspect of the invention aims to overcome this problem.

The second aspect of the invention relates to a method for measuring a first height map and a second height map of a sample surface of a sample with a profilometer and combining the first and second height maps to a composite height map, the method including:

measuring the first and second height maps with a sensor of the profilometer, wherein the sensor is moved relative to the sample surface so that the first and second height maps are measured in partially overlapping fields of view of the sensor;

combining the first and second height maps to produce the composite height map of the sample surface, characterized in, that the combining of the first and second height maps includes:

classifying features of the first and second height maps into sharp features and smooth features;

determining, for multiple subregions of the first and second height maps, a similarity between the respective subregion of the first and second height maps by using a weighted similarity measure between the first and second height maps in the respective subregion wherein the weights are based on the classification of the features into the sharp features and smooth features;

comparing the similarities between the first and second height map in the multiple subregions; and combining the first and second height maps by stitching the first and second height maps in one of the subregions based on the comparing of the similarities, e.g. based on the one subregion having a higher similarity, e.g. in the one subregion having the highest similarity.

The inventors realised that measurement artifacts result predominantly in relatively smooth features compared to sharper features. By increasing the relevance of the sharper features compared to the smooth features in the using of the similarity measure, i.e. using a weighted similarity measure, the impact of measurement artifacts on the matching of the height maps maybe reduced. The features of the height maps may be classified by determining a sharpness thereof, e.g. based on a gradient or height relative to base area thereof. A feature may be classified as sharp if it belongs to the 50%, e.g. 40%, e.g. 20%, sharpest features. A feature may be classified as smooth if it is not sharp. For example, the weights may be determined on a pixel by pixel basis, e.g. based on a gradient associated with the pixel, or on a feature by feature basis. Or the weights maybe binary. For example, all sharp features are assigned a weight that is twice as high as the smooth features. In embodiments, the sharp features have higher weights than the smooth features. The second aspect of the invention may be combined with any other aspect of the invention disclosed herein.

A problem related to combining height maps to obtain a composite height map is that different flat areas of the sample surface may appear similar and may be even more similar than areas having features. If two different flat areas are present the height maps may be stitched along the flat areas because of the high similarity therebetween. The third aspect of the invention aims to overcome this problem.

The third aspect of the invention relates to a method for measuring a first height map and a second height map of a sample surface of a sample with a profilometer and combining the first and second height maps to a composite height map, the method including:

measuring the first and second height maps with a sensor of the profilometer, wherein the sensor includes multiple pixels, and wherein the sensor is moved relative to the sample surface so that the first and second height maps are measured in partially overlapping fields of view of the sensor;

combining the first and second height maps to produce the composite height map of the sample surface, characterized in, that the combining of the first and second height maps includes:

determining one or more flat regions in the first and/or second height maps;

determining modified first and second height maps by providing a variation, e.g. a random variation, in the height values of the flat regions; and determining, for multiple subregions of the first and second modified height maps, a similarity between, in the respective subregion, the first and second modified height maps using a similarity measure;

comparing the similarities between the first and second modified height map in the multiple subregions; and combining the first and second height maps by stitching the first and second height maps in one of the subregions based on the comparing of the similarities, e.g. based on the one subregion having a higher similarity, e.g. in the one subregion having the highest similarity.

The effect of the flat regions on the similarity between the height maps is suppressed by adding a variation, preferably a random variation, e.g. such as random noise, to the flat region of at least one of the height maps to obtain a modified height map. The flat area in the modified height map will appear less flat due to the added variation. Preferably the variation is only added to one of the two height maps and the similarity measures are determined for one modified height map and one unmodified height map.

Flat areas may be areas lacking features. Flat areas may also be determined by looking at their deviation from a plane, for example by comparing different parts of the height map to a plane, and the deviation from the plane provides a measure of flatness.

In embodiments of the third aspect, the one or more flat regions are determined based on a classification of features in the height maps, e.g. wherein flat regions are regions having substantially flat features, e.g. having a gradient below a predetermined threshold value.

The third aspect of the invention may be combined with any other aspect of the invention disclosed herein.

The invention also relates to a profilometer, for example an optical profilometer, including a sensor having pixels for measuring a first height map and a second height map of a sample surface of a sample, a sample holder for holding the sample, and a processor configured for performing the method according to any aspect of the invention.

In embodiments of the profilometer, the processor is configured for:

determining a first overlap region of the first and second height maps by partially overlapping the first and second height maps, in which first overlap region the first and second height maps overlap;

determining a first similarity between the first and second height maps by determining a similarity between the heights of the first and second height maps in the first overlap region using a similarity measure;

determining a second overlap region of the first and second height maps by shifting the first and second height maps relative to each other compared to the first overlap region, wherein the second overlap region preferably has a different surface area than the first overlap region;

determining a second similarity between the first and second height maps by determining a similarity between the heights of the first and second height map in the second overlap region using the similarity measure;

comparing the first and second similarities by normalizing the first and second similarities based on the respective surface areas of the overlap regions;

combining the first and second height maps by stitching the first and second height maps in one of the overlap regions based on the comparing of the first and second similarities, e.g. in the one overlap region having a higher similarity; and outputting a composite height map of the sample surface based on the combined first and second height maps.

In embodiments the processor is configured for:

causing the profilometer to measure the first and second height maps with a sensor of the profilometer, wherein the sensor is moved relative to the sample surface so that the first and second height maps are measured in partially overlapping fields of view of the sensor;

combining the first and second height maps to produce the composite height map of the sample surface, characterized in, that the combining of the first and second height maps includes:

classifying features of the first and second height maps into sharp features and smooth features;

determining, for multiple subregions of the first and second height maps, a similarity between the respective subregion of the first and second height maps by using a weighted similarity measure between the first and second height maps in the respective subregion wherein the weights are based on the classification of the features into the sharp features and smooth features;

comparing the similarities between the first and second height map in the multiple subregions; and combining the first and second height maps by stitching the first and second height maps in one of the subregions based on the comparing of the similarities, e.g. based on the one subregion having a higher similarity, e.g. in the one subregion having the highest similarity.

In embodiments the processor is configured for:

causing the profilometer to measure the first and second height maps with a sensor of the profilometer, wherein the sensor is moved relative to the sample surface so that the first and second height maps are measured in partially overlapping fields of view of the sensor;

combining the first and second height maps to produce the composite height map of the sample surface, characterized in, that the combining of the first and second height maps includes:

determining one or more flat regions in the first and/or second height maps;

determining modified first and second height maps by providing a variation, e.g. a random variation, in the height values of the flat regions; and determining, for multiple subregions of the first and second modified height maps, a similarity between in the respective subregion of the first and second modified height maps;

comparing the similarities between the first and second modified height map in the multiple subregions; and combining the first and second height maps by stitching the first and second height maps in one of the subregions based on the comparing of the similarities, e.g. based on the one subregion having a higher similarity, e.g. in the one subregion having the highest similarity.

The invention also relates to a digital data carrier including software for, when run on a processor of a profilometer according to the invention, causes the profilometer to perform the method according to the invention.

BRIEF DESCRIPTION OF THE DRAWINGS

Embodiments of the invention will now be described, by way of example, with reference to the accompanying drawing in which corresponding reference symbols indicate corresponding parts, and in which.

DESCRIPTION OF THE EMBODIMENTS

Figure 1:
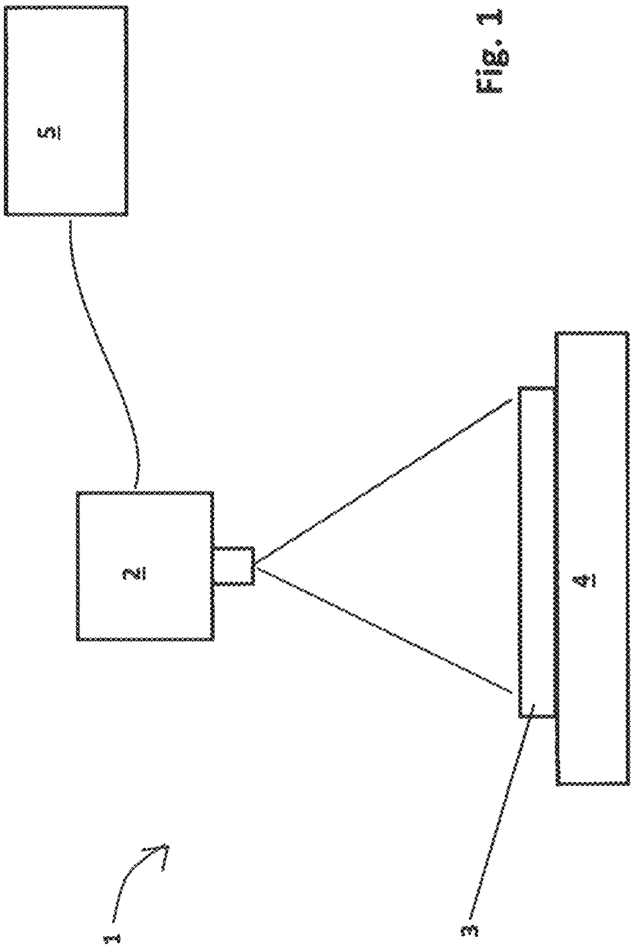
FIG. 1 depicts a profilometer.
Figure 2:
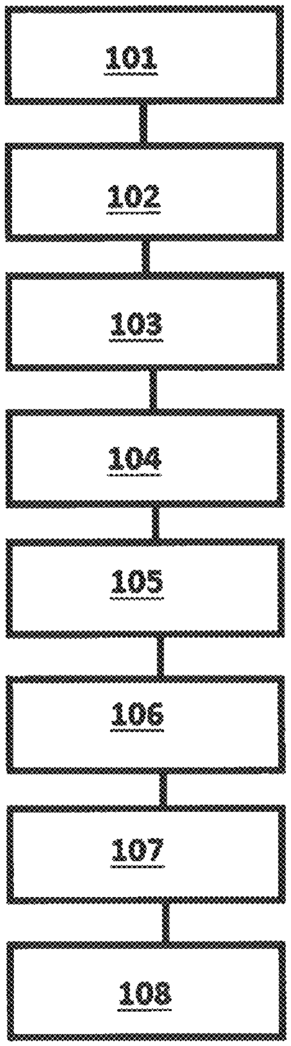
FIG. 2 depicts a flow chart of a method according to the first aspect.
Figure 3:
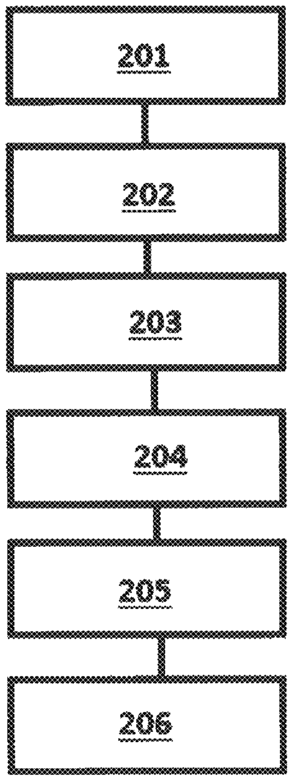
FIG. 3 depicts a flow chart of a method according to the second aspect.
Figure 4:
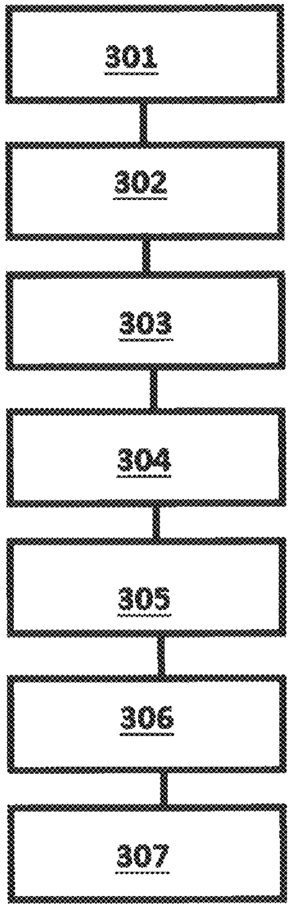
FIG. 4 depicts a flow chart of a method according to the third aspect.

FIG. 1 depicts a profilometer 1, for example an optical profilometer 1, including a sensor 2 having pixels for measuring a first height map and a second height map of a sample surface of a sample 3. The profilometer 1 may be a interferometer, such as a white light interferometer, configured to measure a height map of the sample 3 using interference patterns.

The profilometer may further include a sample holder 4 for holding the sample 3. The sample holder 4 may allow relative movement of the sample 3 and the sensor 2 to allow for the measuring of the first and second height maps in partially overlapping fields of view of the sensor 2.

The profilometer includes a processor 5 which is connected to the sensor 2 to allow to receive the measured height maps of the sample surface from the sensor 2. The processor 5 is configured to perform the method of the invention. For example according to the first aspect, the processor 5 may be configured to:

causing 101 the sensor 2 to measure the first and second height maps with, wherein the sensor 2 is moved relative to the sample surface so that the first and second height maps are measured in partially overlapping fields of view of the sensor 2;

combine the first and second height maps to produce the composite height map of the sample surface; and outputting 108 a composite height map of the sample surface based on the combined first and second height maps, wherein the combining of the first and second height maps includes:

determining 102 a first overlap region of the first and second height maps by partially overlapping the first and second height maps, in which first overlap region the first and second height maps overlap;

determining 103 a first similarity between the first and second height maps by determining a similarity between the heights of the first and second height maps in the first overlap region using a similarity measure;

determining 104 a second overlap region of the first and second height maps by shifting the first and second height maps relative to each other compared to the first overlap region, wherein the second overlap region preferably has a different surface area than the first overlap region;

determining 105 a second similarity between the first and second height maps by determining a similarity between the heights of the first and second height map in the second overlap region using the similarity measure;

comparing 106 the first and second similarities by normalizing the first and second similarities based on the respective surface areas of the overlap regions; and combining 107 the first and second height maps to produce the composite height map by stitching the first and second height maps in one of the overlap regions based on the comparing of the first and second similarities, e.g. in the one overlap region having a higher similarity.

For example according to the second aspect, the processor 5 may be configured for:

causing 201 the sensor 2 to measure the first and second height maps with, wherein the sensor 2 is moved relative to the sample surface so that the first and second height maps are measured in partially overlapping fields of view of the sensor 2;

combining the first and second height maps to produce the composite height map of the sample surface; and outputting 206 a composite height map of the sample surface based on the combined first and second height maps, wherein the combining of the first and second height maps includes:

classifying 202 features of the first and second height maps into sharp features and smooth features;

determining 203, for multiple subregions of the first and second height maps, a similarity between the respective subregion of the first and second height maps by using a weighted similarity measure between the first and second height maps in the respective subregion wherein the weights are based on the classification of the features into the sharp features and smooth features;

comparing 204 the similarities between the first and second height map in the multiple subregions; and combining 205 the first and second height maps by stitching the first and second height maps in one of the subregions based on the comparing of the similarities, e.g. based on the one subregion having a higher similarity, e.g. in the one subregion having the highest similarity.

For example according to the third aspect, the processor 5 may be configured for:

causing 301 the sensor 2 to measure the first and second height maps with, wherein the sensor 2 is moved relative to the sample surface so that the first and second height maps are measured in partially overlapping fields of view of the sensor 2;

combining the first and second height maps to produce the composite height map of the sample surface; and outputting 302 a composite height map of the sample surface based on the combined first and second height maps, characterized in, that the combining of the first and second height maps includes:

determining 303 one or more flat regions in the first and/or second height maps;

determining 304 modified first and second height maps by providing a variation, e.g. a random variation, in the height values of the flat regions; and determining 305, for multiple subregions of the first and second modified height maps, a similarity between in the respective subregion of the first and second modified height maps;

comparing 306 the similarities between the first and second modified height map in the multiple subregions; and combining 307 the first and second height maps by stitching the first and second height maps in one of the subregions based on the comparing of the similarities, e.g. based on the one subregion having a higher similarity, e.g. in the one subregion having the highest similarity.

What is claimed is:

1. A method for measuring a first height map and a second height map of a sample surface of a sample with a profilometer and combining the first and second height maps to a composite height map, the method including:

measuring the first and second height maps with a sensor of the profilometer, wherein the sensor is moved relative to the sample surface so that the first and second height maps are measured in partially overlapping fields of view of the sensor;

combining the first and second height maps to produce the composite height map of the sample surface, characterized in, that the combining of the first and second height maps includes:

determining a first overlap region of the first and second height maps by partially overlapping the first and second height maps, in which first overlap region the first and second height maps overlap;

determining a first similarity between the first and second height maps by determining a similarity between the heights of the first and second height maps in the first overlap region using a similarity measure;

determining a second overlap region of the first and second height maps by shifting the first and second height maps relative to each other compared to the first overlap region;

determining a second similarity between the first and second height maps by determining a similarity between the heights of the first and second height map in the second overlap region using the similarity measure;

comparing the first and second similarities by normalizing the first and second similarities based on the respective surface areas of the overlap regions; and combining the first and second height maps by stitching the first and second height maps in one of the overlap regions based on the comparing of the first and second similarity measures.

2. The method according to claim 1, wherein the method further includes:

determining a plurality of overlap regions of the first and second height maps by shifting the first and second height maps subsequently relative to each other;

determining, after each shift of the first and second height maps, a similarity between the first and second height maps by determining a similarity between the heights of the first and second height map in the respective overlap region by using the similarity measure;

comparing the plurality of similarities by normalizing the similarities based on the respective surface areas of the overlap regions; and combining the first and second height maps by stitching the first and second height maps in one of the overlap regions based on the comparing of the plurality of similarities.

3. The method according to claim 1, wherein the sensor includes multiple pixels, and wherein the first and second height maps are shifted relative to each other by a single pixel of the sensor.

4. The method according to claim 1, wherein the similarity measure is based on a correlation for determining a correlation between the heights of the first and second height map in the respective overlap region and wherein the first and second height maps are combined based on the correlations.

5. The method according to claim 4, wherein the correlations are determined based on a zero-normalized cross-correlation function:

$$C = \frac{1}{N}\frac{1}{sV}\frac{1}{sW}\sum(V_i - meanV)(W_i - meanW)$$

wherein N is the surface area of the respective overlap region, sV is the standard deviation of heights in the respective overlap region of the first height map, sW is the standard deviation of heights in the respective overlap region of the second height map, $V_i$ are the heights in the respective overlap region of the first height map, $W_i$ are the heights in the respective overlap region of the second height map, meanV is the mean height in the respective overlap region of the first height map, and meanW is the mean height in the respective overlap region of the second height map.

6. The method according to claim 1, wherein the method further includes:

classifying features of the two height maps into sharp features and smooth features; and determining the similarity for each of the overlap regions by using a weighted similarity measure, wherein the weights are based on the classification of the features into the sharp features and smooth features.

7. The method according to claim 6, wherein the sharp features have higher weights than the smooth features.

8. The method according to claim 6, wherein the features are classified based on a gradient thereof and/or wherein the weights are based on the gradients.

9. The method according to claim 1, wherein the method further includes:

determining one or more flat regions in the first and/or second height maps;

determining modified first and second height maps by providing a variation in the height values of the flat regions; and determining the similarity between the first and second height maps in the first overlap region using the similarity measure.

10. The method according to claim 9, wherein the one or more flat regions are determined based on a classification of features in the height maps.

11. A profilometer including a sensor having pixels for measuring a first height map and a second height map of a sample surface of a sample, and a processor configured for performing the method according to claim 1.

12. The profilometer according to claim 11, wherein the processor is configured for:

causing the sensor to measure the first and second height maps, wherein the sensor is moved relative to the sample surface so that the first and second height maps are measured in partially overlapping fields of view of the sensor;

combining the first and second height maps to produce the composite height map of the sample surface; and outputting a composite height map of the sample surface based on the combined first and second height maps, wherein the combining of the first and second height maps includes:

determining a first overlap region of the first and second height maps by partially overlapping the first and second height maps, in which first overlap region the first and second height maps overlap;

determining a first similarity between the first and second height maps by determining a similarity between the heights of the first and second height maps in the first overlap region using a similarity measure;

determining a second overlap region of the first and second height maps by shifting the first and second height maps relative to each other compared to the first overlap region;

determining a second similarity between the first and second height maps by determining a similarity between the heights of the first and second height map in the second overlap region using the similarity measure;

comparing the first and second similarities by normalizing the first and second similarities based on the respective surface areas of the overlap regions; and combining the first and second height maps by stitching the first and second height maps in one of the overlap regions based on the comparing of the first and second similarities.

13. A non-transitory computer readable medium including software which, when run on a processor of a profilometer including a sensor which has pixels for measuring a first height map and a second height map of the sample surface of a sample, causes the profilometer to perform a method for measuring a first height map and a second height map of a sample surface of a sample with a profilometer and combining the first and second height maps to a composite height map, the method including:

combining the first and second height maps to a composite height map, the method including:

measuring the first and second height maps with a sensor of the profilometer, wherein the sensor is moved relative to the sample surface so that the first and second height maps are measured in partially overlapping fields of view of the sensor;

combining the first and second height maps to produce the composite height map of the sample surface, wherein the combining of the first and second height maps includes:

determining a first overlap region of the first and second height maps by partially overlapping the first and second height maps, in which first overlap region the first and second height maps overlap;

determining a first similarity between the first and second height maps by determining a similarity between the heights of the first and second height maps in the first overlap region using a similarity measure;

determining a second overlap region of the first and second height maps by shifting the first and second height maps relative to each other compared to the first overlap region;

determining a second similarity between the first and second height maps by determining a similarity between the heights of the first and second height map in the second overlap region using the similarity measure;

comparing the first and second similarities by normalizing the first and second similarities based on the respective surface areas of the overlap regions; and combining the first and second height maps by stitching the first and second height maps in one of the overlap regions based on the comparing of the first and second similarity measures.

* * * * *